United States Patent
Davis

(10) Patent No.: US 11,416,294 B1
(45) Date of Patent: Aug. 16, 2022

(54) TASK PROCESSING FOR MANAGEMENT OF DATA CENTER RESOURCES

(71) Applicant: Juniper Networks, Inc., Sunnyvale, CA (US)

(72) Inventor: Dale Davis, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 500 days.

(21) Appl. No.: 16/387,192

(22) Filed: Apr. 17, 2019

(51) Int. Cl.
*G06F 9/46* (2006.01)
*G06F 9/50* (2006.01)
*G06F 9/54* (2006.01)
*G06F 9/38* (2018.01)

(52) U.S. Cl.
CPC .......... *G06F 9/5005* (2013.01); *G06F 9/3891* (2013.01); *G06F 9/542* (2013.01); *G06F 9/546* (2013.01)

(58) Field of Classification Search
CPC ...... G06F 9/5005; G06F 9/3891; G06F 9/542; G06F 9/546
See application file for complete search history.

(56) References Cited

U.S. PATENT DOCUMENTS

| | | | |
|---|---|---|---|
| 2017/0351555 A1* | 12/2017 | Coffin | G06F 9/5016 |
| 2018/0159927 A1* | 6/2018 | Wu | H04L 67/1097 |
| 2018/0367460 A1* | 12/2018 | Gao | G06F 9/5083 |
| 2019/0004868 A1* | 1/2019 | Zhou | G06F 9/5083 |
| 2020/0257566 A1* | 8/2020 | Ganguli | G06F 1/20 |

OTHER PUBLICATIONS

Bielicki, "LizardFS Documentation," accessed from https://buildmedia.readthedocs.org/media/pdf/lizardfs-docs/stable/lizardfs-docs pdf, Jun. 15, 2018, 147 pp.
"LizardFS, White paper Version 3.12," accessed from https://lizardfs.com/wp-content/uploads/2018/06/whitepaper_lizard_v3.12_web.pdf, Jun. 2018, 23 pp.
"LizardFS, White paper Version 3.10," accessed from https://lizardfs.com/wp-content/uploads/2017/01/LizardFS-WhitePaper-Eng-v9-3.10-web-18oct-small.pdf, Jan. 2017, 20 pp.
"Introduction to LizardFS," LizardFS Handbook, accessed from https://docs.lizardfs.com/introduction.html, accessed on May 7, 2020, 4 pp.

(Continued)

*Primary Examiner* — Tammy E Lee
(74) *Attorney, Agent, or Firm* — Shumaker & Sieffert, P.A.

(57) ABSTRACT

An example method includes receiving a resource management request associated with resources provided by at least one data center, creating, based on the resource management request, task data elements including at least first and second task data elements, adding the task data elements to a task data structure accessible at least by a first and second worker processes, removing, by the first worker process, a first task data element from the task data structure and initiate execution of a first task, removing, by the second worker process, a second task data element from the task data structure and initiate execution of a second task, wherein the second worker process executes at least a portion of the second task while the first worker process executes at least a portion of the first task in parallel, and sending, to the client computing device, a response to the resource management request.

19 Claims, 8 Drawing Sheets

(56) References Cited

OTHER PUBLICATIONS

"What Lizard Gives You," Lizard FS, accessed from https://lizardfs.com/, accessed on May 7, 2020, 4 pp.

"LizardFS is an Open Source Distributed File System licensed under GPLv3," GitHub, LizardFS, accessed from https://github.com/lizardfs/lizardfs, accessed on May 7, 2020, 2 pp.

"Welcome to LizardFS's documentation," LizardFS Handbook, accessed from https://docs.lizardfs.com/, accessed on May 7, 2020, 3 pp.

YouTube, "FOSDEM 2017—Storage overloaded to smoke? Legolize with LizardFS!," uploaded by LizardFS Software Defined Storage, Feb. 7, 2017, accessed from https://www.youtube.com/watch?v=gz3XAfAbfxl, 1 pp.

YouTube, "LizardFS on FOSDEM 2018 'Year in Development,'" uploaded by LizardFS Software Defined Storage, Mar. 2, 2018, accessed from https://www.youtube.com/watch?v=vpaanFRRjBk, 1 pp.

YouTube, "LizardFS as a storage for Elasticsearch," uploaded by LizardFS Software Defined Storage, Sep. 14, 2018, accessed from https://www.youtube.com/watch?v=jSodzbA2o9l, 1 pp.

YouTube, "LizardFS Intro," uploaded by LizardFS Software Defined Storage, Aug. 7, 2018, accessed from https://www.youtube.com/watch?v=oPASAHS2-D0, 1 pp.

YouTube, "LizardFS presentation," uploaded by LizardFS Software Defined Storage, Mar. 28, 2018, accessed from https://www.youtube.com/watch?v=H9dOue6EJz0, 1 pp.

YouTube, "FOSDEM 2018 Lizardfs Opennebula Connector release," uploaded by LizardFS Software Defined Storage, Mar. 2, 2018, accessed from https://www.youtube.com/watch?v=MFP1CvggpEM, 1 pp.

YouTube, "LizardFS Software Defined Sotrage," uploaded by LizardFS Software Defined Storage, Aug. 16, 2016, accessed from https://www.youtube.com/watch?v=ILjZD97Lbo4, 1 pp.

YouTube, "LizardFS @ Platige Image," uploaded by LizardFS Software Defined Storage, Jun. 22, 2016, accessed from https://www.youtube.com/watch?v=dZ4Fx48d3jM, 1 pp.

YouTube,"LizardFS native Windows client," uploaded by LizardFS Software Defined Storage, Jun. 21, 2016, accessed from https://www.youtube.com/watch?v=KKDaeVALHV4, 1 pp.

U.S. Appl. No. 16/355,289, filed Mar. 15, 2019, Juniper Networks, Inc. (inventor: Echegaray et al.) entitled "Storage Volume Replication Across Multiple Data Centers".

"Celery: Distributed Task Queue" Celery, available at www.celeryproject.org last accessed Apr. 16, 2019, 2 pp.

"Celery (software)" Wikipedia, available at https://en.wikipedia.org/wiki/Celery last accessed Apr. 16, 2019, last edited Mar. 10, 2019, 2 pp.

"Apache-libcloud 2.4.0" PyPI, available at https://pypi.org/project/apache-libcloud/ last accessed Apr. 16, 2019, release dated Nov. 10, 2018, 4 pp.

"One Interface to Rule Them All" available at https://libcloud.apache.org/ last accessed Apr. 17, 2019, 3 pp.

\* cited by examiner

TASK PROCESSING FOR MANAGEMENT OF DATA CENTER RESOURCES

TECHNICAL FIELD

This disclosure relates to management of resources in computer networks.

BACKGROUND

In a typical data center, a large collection of interconnected servers provides computing and/or storage capacity for execution of various applications. For example, a data center may comprise a facility that hosts applications and services for subscribers or customers of the data center. The data center may, for example, host infrastructure equipment, such as networking and storage systems, redundant power supplies, and environmental controls. In some data centers, clusters of storage systems and application servers are interconnected via a high-speed network fabric provided by one or more tiers of physical network devices, such as switches and routers. Certain sophisticated data centers provide infrastructure spread throughout the world with subscriber support equipment located in various physical hosting facilities.

SUMMARY

In general, this disclosure describes techniques for processing tasks to manage one or more resources (e.g., nodes, storage volumes, application containers) provided by one or more data centers (e.g., geographically remote and/or on-premises data centers). For example, the disclosed techniques may enable the processing of various task data elements that are dynamically created and stored in a task data structure (e.g., task queue) in response to incoming resource management requests. These requests are associated with resources provided by the one or more data centers. As different worker processes become available to handle tasks, these worker processes are capable of asynchronously removing task data elements from the task data structure and initiating execution of corresponding tasks associated with the resource management requests. As a result, the worker processes may be capable of executing these tasks at least partially in parallel, such that the management of data center resources is not necessarily bottle-necked by system services being capable of sequentially handling only one task and/or resource management request at a time. Thus, the techniques described herein may enable at least partial parallelization of task and workflow execution to improve the scaling and management of data center resources, such as nodes, storage volumes, and containers, that are provided to the system.

In one example, a method includes receiving, from a client device, a resource management request associated with one or more resources provided by at least one data center, creating, based on the resource management request, a plurality of task data elements that includes at least a first task data element and a second task data element, and adding the plurality of task data elements to a task data structure that is accessible at least by a first worker process and a second worker process. The example method further includes removing, by the first worker process, the first task data element from the task data structure and initiating execution of a first task associated with the first task data element, and after removing the first task data element by the first worker process, removing, by the second worker process, the second task data element from the task data structure and initiating execution of a second task associated with the second task data element, wherein the second worker process executes at least a portion of the second task while the first worker process executes at least a portion of the first task in parallel. The example method further includes sending, to the client computing device, a response to the resource management request, wherein the response is associated with a respective status of each of the first and second tasks.

In another example, a computing system includes one or more processors and at least one computer-readable storage medium. The at least one computer-readable storage medium stored instructions that, when executed, cause the one or more processors to: receive, from a client device, a resource management request associated with one or more resources provided by at least one data center; create, based on the resource management request, a plurality of task data elements that includes at least a first task data element and a second task data element; add the plurality of task data elements to a task data structure that is accessible at least by a first worker process and a second worker process; remove, by the first worker process, the first task data element from the task data structure and initiating execution of a first task associated with the first task data element; after removing the first task data element by the first worker process, remove, by the second worker process, the second task data element from the task data structure and initiating execution of a second task associated with the second task data element, wherein the second worker process executes at least a portion of the second task while the first worker process executes at least a portion of the first task in parallel; and send, to the client computing device, a response to the resource management request, wherein the response is associated with a respective status of each of the first and second tasks.

In another example, a computer-readable storage medium stores instructions that are executable by at least one processor to: receive, from a client device, a resource management request associated with one or more resources provided by at least one data center; create, based on the resource management request, a plurality of task data elements that includes at least a first task data element and a second task data element; add the plurality of task data elements to a task data structure that is accessible at least by a first worker process and a second worker process; remove, by the first worker process, the first task data element from the task data structure and initiating execution of a first task associated with the first task data element; after removing the first task data element by the first worker process, remove, by the second worker process, the second task data element from the task data structure and initiating execution of a second task associated with the second task data element, wherein the second worker process executes at least a portion of the second task while the first worker process executes at least a portion of the first task in parallel; and send, to the client computing device, a response to the resource management request, wherein the response is associated with a respective status of each of the first and second tasks.

The details of one or more examples are set forth in the accompanying drawings and the description below. Other features, objects, and advantages will be apparent from the description and drawings, and from the claims.

BRIEF DESCRIPTION OF DRAWINGS

FIG. 3A illustrates the receipt of the resource management request and the addition of corresponding task data elements to a task queue. FIG. 3B illustrates the removal of a first task data element from the task queue by a first worker processes, and the initiation of execution of a first corresponding task. FIG. 3C illustrates the removal of a second task data element from the task queue by a second worker process, and the initiation of execution of a second corresponding task.

DETAILED DESCRIPTION

As noted above, the present disclosure describes techniques for task processing to manage one or more resources (e.g., nodes, storage volumes, application containers) provided by one or more data centers (e.g., geographically remote and/or on-premises data centers). For example, the disclosed techniques may enable the processing of various task data elements that are dynamically created and stored in a task data structure (e.g., task queue) in response to incoming resource management requests. Various different worker processes are capable of asynchronously removing the task data elements from the task data structure and initiating execution of corresponding tasks associated with the resource management requests.

Thus, the techniques described herein may enable at least partial parallelization of task and workflow execution to improve the scaling and management of data center resources, such as nodes, storage volumes, and containers. The state of these managed resources may be refreshed periodically and stored in a database. Through the processing of incoming resource management requests and creation of corresponding task data elements that are added into a task data structure, and as worker processes that subscribe to the task data structure become available to process tasks, these worker processes are capable of asynchronously removing task data elements from the task data structure and executing tasks at least partially in parallel. As a result, the techniques described herein may enable breaking the business logic found in certain micro-service application programming interface (API) request handlers into discrete, composable tasks, which allows workflows to be composed and handled. These workflows may include sequential chains of dependent tasks and groups of one or more independent tasks that may be executed at least partially in parallel. For certain cases in which a given task includes a sequential chain of multiple subtasks, worker processes may thus be configured to execute the sequential chain of subtasks in parallel with other independent tasks. The workflows, being tasks themselves, can be chained and/or grouped for execution, as well.

Figure 1:
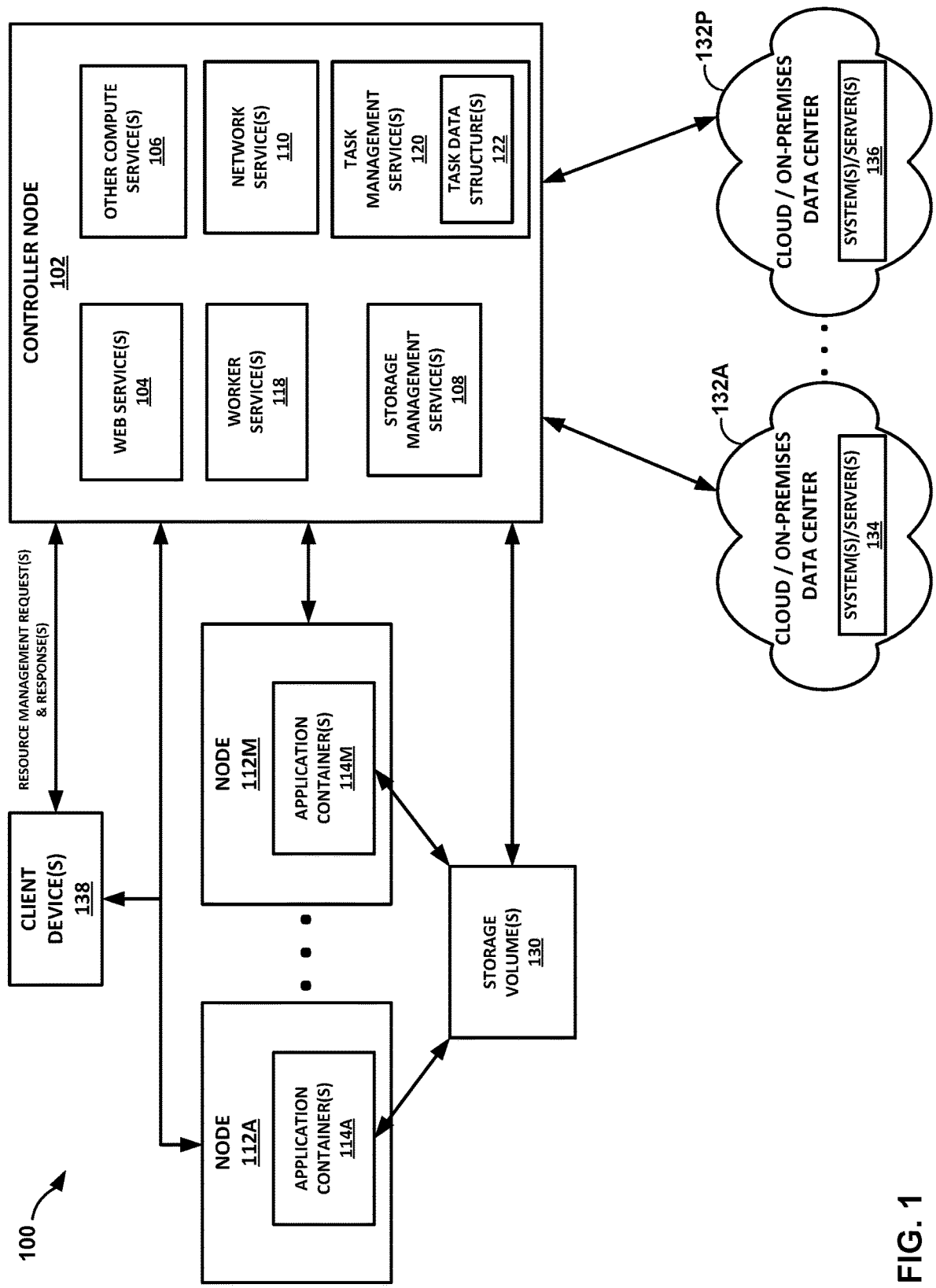
FIG. 1 is a block diagram illustrating an example system that is configured to process incoming resource management requests and create corresponding task data elements that are associated with resources provided by one or more data centers, in accordance with one or more techniques of the disclosure.

FIG. 1 is a block diagram illustrating an example system 100 that is configured to process incoming resource management requests and create corresponding task data elements that are associated with resources provided by one or more data centers (e.g., data centers 132A-132P, collectively "data centers 132"), in accordance with one or more techniques of the disclosure. As illustrated in FIG. 1, data centers 132 may include one or more on-premises data centers, which may be local to, or on-site, with respect to customer or client devices (e.g., client devices 138). Data centers 132 may also include one or more cloud data centers that are remote from customer or client devices and that are provided and/or maintained by one or more respective service providers. For example, data center 132A may be provided and/or maintained by one particular third-party service provider (e.g., service provider "A"), and data center 132P may be provided and/or maintained by a different third-party service provider (e.g., service provider "P"). Each one of data centers 132 may be physically located at one geographical location or distributed among different geographical locations.

In general, one or more of data centers 132 may provide an operating environment for applications and services for nodes that are included in or coupled to the respective data center. One or more of data centers 132 may, for example, host infrastructure equipment, such as networking and storage systems, redundant power supplies, and environmental controls. In some examples, a service provider network that couples nodes to one or more of data centers 132 may be coupled to one or more networks administered by other providers, and may thus form part of a large-scale public network infrastructure, e.g., the Internet.

In some examples, data centers 132 may each represent one or more geographically distributed network data centers. Data centers 132 may include facilities that provide network services for customer devices (e.g., one or more client devices 138), which may be, e.g., devices of entities such as enterprises and governments or individuals. For example, a network data center may host web services for several enterprises and end users. Other example services may include data storage, virtual private networks, traffic engineering, file service, data mining, scientific- or super-computing, and so on. In some cases, data centers 132 may include individual network servers, network peers, or otherwise.

In various examples, one or more of data centers 132 may each include a set of storage systems and/or application servers. For example, as shown in FIG. 1, data center 132A may include one or more storage systems and/or servers 134, and data center 132P may include one or more storage systems and/or servers 136. These systems and/or servers of any given data center may, in some cases, be interconnected via an Internet protocol (IP) fabric, which may comprise a fabric provided by one or more tiers of physical network devices, such as, for example, routers, gateways, switches, hubs, modems, bridges, repeaters, multiplexers, servers, virtual machines running on one or more of the same, and other example network devices. In certain examples, the IP fabric may include three tiers of devices: one or more spine devices, one or more aggregation devices, and one or more leaf devices. Other topologies may be used in other examples. The storage systems and servers of a given data center (e.g., systems/servers 134 of data center 132A, systems/servers 136 of data center 132P) may provide execution and storage environments for applications and data associated with customer devices and may be physical servers, virtual machines or combinations thereof.

System 100 illustrated in FIG. 1 also includes one or more client devices 138, a controller node 102, and one or more additional nodes 112A-112M (collectively, "nodes 112"). Each of nodes 102 and/or 112 may comprise one or more physical devices, virtual devices, or other entities, such as one or more computing devices, server devices, client devices, virtual machines, or the like, and one or more of these nodes may be provided or maintained by one or more of data centers 132. Client devices 138 may be communicatively coupled to controller node 102 and/or nodes 112. In addition, controller node 102 may be communicatively coupled to each of nodes 112.

Controller node 102 may include various different services or applications. As shown in the example of FIG. 1, controller node 120 includes one or more web services 104, one or more worker services 118, one or more network services 110, one or more storage management services 108, one or more task management services 120, and one or more other compute services 106. Each of the services or applications provided by controller node 102 may include one or more micro-services that implement at least a portion of the functionality of the respective service or application. In addition, each of the services or applications provided by controller node 102 may be implemented or executed in one or more application containers that are deployed by controller node 102. For example, web services 104 may be executed in one or more web application containers that are deployed by controller node 102. Compute services 106 may be executed in one or more compute service containers deployed by controller node 102. Network services 110 may be executed in one or more network service containers deployed by controller node 102. Worker services 118 may be executed in one or more worker service containers deployed by controller node 102. Storage management services 108 may be executed in one or more storage management containers deployed by controller node 102, and task management services 122 may be executed in one or more task management service containers deployed by controller node 102.

Web services 104 may include or more web services or applications that are executable by client devices 138 (e.g., in one or more web browsers output by client devices 138), including applications that provide graphical user interface functionality. Web services 104 may provide or include one or more web servers or web server functionality that interfaces with client devices 138. Compute services 106 may provide various compute and processing functionality in system 100. Network services 110 may include networking and network management services to system 100. Storage management services 108 may provide storage management functionality in system 100, including management of storage volumes associated with data that is provided by data centers 132. As will be described in further detail below, task management services 120 may provide one or more services related to task management and processing within system 100. Worker services 118 may provide or be composed of one or more workers, or worker child processes, that are capable of executing tasks managed by task management services 120, and may be configured to execute at least a portion of these tasks in parallel, as described further below.

As shown in FIG. 1, storage management services 108 may provide a persistent data storage layer that is virtually positioned over data centers 132. Through implementation of storage management services 108, client devices 138 and nodes 102, 112 may obtain access to data centers 132 and corresponding data center storage systems and/or servers (e.g., systems/servers 134, systems/servers 136) via this persistent data storage layer. Rather than directly accessing data that is stored on data centers 132, client devices 138 and nodes 102, 112 may access virtual data referred to as storage volumes 130, which are associated with data stored directly on data centers 132. The data associated with storage volumes 130 may be provided by data centers 132, and one or more of storage volumes 130 may be attached to individual application containers, such as application containers 114A-114M illustrated in FIG. 1 (collectively, "application containers 114"), which may then access any of storage volumes 130 for data read and/or write operations. Storage volumes 130 may be associated with an amount of collective storage data provided by data centers 132. For example, if data centers 132 collectively provide 100 TB of data that is allocated in system 100, storage volumes 130 collectively may be associated with this 100 TB of data, and may enable access to such data by client devices 138 and nodes 102, 112 (e.g., via storage management services 108, which may provide a virtual file system for accessing and/or managing storage volumes 130).

In some examples, task management services 120 may create one or more storage volumes 130. Task management services 120 may, in some instances, create storage volumes 130 responsive to receiving user input from client devices 138 via web services 104 to create the volume, and/or responsive to a request from an individual node or container (e.g., node 112A or one of containers 114). Storage volumes 130 may each have various attributes or features, such as name and/or identifier, a date/time of last modification, a status, replication details, and/or other attributes. Storage systems/servers 134 and 136 of data centers 132A and 132P, respectively, may include data storage elements that are associated with storage volumes 130. Storage management services 108 may assist with management of and/or providing access to storage volumes 130 (e.g., by nodes 112).

Any of nodes 112 may, in some examples, comprise a virtual machine that is executed by client devices 138 or controller node 102 (e.g., by web services 104, compute services 106, storage management services 108, network services 110, worker services 118, and/or task management services 120). Each of the deployed nodes may include one or more deployed application containers, which each include one or more applications for execution. For example, FIG. 1 shows node 112A having one or more application containers 114A, and node 112M having one or more application containers 114M. In various examples, application containers 114A may provide workload functionality or include one or more workload applications that are implemented during deployment of node 112A. Similarly, application containers 114M may provide workload functionality or include one or more workload applications that are implemented during deployment of node 112M. Further details regarding the deployment and use of application containers, nodes, and storage volumes as data center resources are described in U.S. application Ser. No. 16/355, 289, filed Mar. 15, 2019 and entitled "STORAGE VOLUME REPLICATION ACROSS MULTIPLE DATA CENTERS," which is incorporated herein by reference in its entirety.

As described above, controller node 102 may receive one or more resource management requests from client devices 138. For example, web services 104 may receive these requests and later provide corresponding responses back to client devices 138. As described herein, in some examples, web services 104 may receive a resource management request from client device 138. This resource management request is associated with one or more resources provided by at least one of data center 132. For example, these one or more resources may include at least one node, storage volume, or application container (e.g., one or more of nodes 112, storage volumes 130, and/or application containers 114 shown in FIG. 1).

Web services 104 may, in some cases, provide the received resource management request to task management services 120. In some examples, task management services 120 may include one or more micro-services that implement at least a portion of the functionality of task management services 120. The resource management request may be associated with various different tasks that are to be executed in order to create or manage the associated resources. As a result, task management services 120 may create, based on the resource management request, different task data elements that are collectively assigned to the resource management request and that are associated to these tasks. Task management services 120 may then add these task data elements to a task data structure. As shown in FIG. 1, task management services 120 includes one or more task data structures 122. In some examples, as described in further detail below, task data structures 122 may comprise one or more task queues.

Rather than serially or sequentially processing tasks associated with the task data elements, which may cause added delay in the execution of these tasks, the present disclosure describes techniques for processing these tasks at least partially in parallel. Worker processes included in or provided by worker services 118 may be configured to perform such parallel execution of these tasks. As noted above, task management services 120 may add the task data elements created from the received resource management request to one or more task data structures 122. Task data structures 122 are accessible by worker services 118. Worker services 118 may include or be composed of various different worker child processes that are executable in controller node 102 to handle the processing of tasks. In one example, the task data elements added to task data structure 122 may include a first task data element and a second task data element, and worker services 118 may include a first worker process and a second worker process that each have access to task data structure 122.

At any given time, the first worker process of worker services 118 may be available to handle one or more tasks. This first worker process may then remove the first task data element from task data structure 122 and initiate execution of a first task associated with the first task data element. After the first worker process has removed the first task data element from task data structure 122, the second worker process may remove the second task data element from task data structure 122, based on the availability of the second worker process to handle one or more tasks. The second worker process may then initiate execution of a second task associated with the second task data element. In addition, the second worker process may execute at least a portion of the second task while the first worker process executes at least a portion of the first task in parallel. As a result, the first and second worker processes may execute at least a portion of these tasks in parallel, rather than executing the tasks in serial or sequential fashion, which may cause added delay. In addition, task management services 120 does not necessarily need to block or wait for certain tasks to complete prior to initiating execution of other tasks, but is instead enabled to operate with worker services 118 to execute tasks at least partially in parallel based upon the availability of worker processes that are provided by worker services 118.

Upon removal of the first and second task data elements from task data structure 122, and initiation of execution of the first and second tasks, task management services 120 may provide a response to web services 104 indicating a respective status of each of the first and second tasks. Web services 104 may then provide this response back to client device 138 responsive to the original resource management request. Client devices 138 may then process the response to determine the status of these tasks. In various examples, the first and second worker processes may not have yet completed execution of the first and second tasks when the response is provided to client devices 138. The response, however, may include a link (e.g., Uniform Resource Locator, or URL, link) to a document or page managed and updated by task management services 120. Task management services 120 may periodically update the document or page referenced by this link, and client device 138 may monitor the link to obtain an updated status (e.g., successful completion, failure) of task execution. In other examples, task management service 120 may provide a second or updated response to client device 138, via web service 104, upon completion of the execution, or failure, of the first and/or second tasks.

Thus, this disclosure describes techniques for the processing of tasks to manage resources (e.g., one or more nodes 112, storage volumes 130, application containers 14) provided by one or more data centers 132. For example, the disclosed techniques may enable the processing of various task data elements that are dynamically created and stored in task data structures 122 (e.g., task queues) in response to incoming resource management requests from client devices 138. Different worker processes provided by worker services 118 are capable of asynchronously removing the task data elements from task data structures 122 provided by task management services 120 and executing corresponding tasks associated with the resource management requests as these worker processes become available to handle tasks.

As a result, the worker processes may be capable of executing these tasks at least partially in parallel, such that the management of data center resources is not necessarily bottlenecked by worker processes or other system services being able to handle only one task and/or resource management request at a time. Thus, the techniques described herein may enable at least partial parallelization of task and workflow execution to improve the scaling and management of data center resources. In some cases, the combination of task data structures 122 and consuming worker processes provided by worker services 118 in system 100 can be scaled vertically by increasing the number of processing cores (e.g., central processing unit) provided by or to controller node 102, increasing the speed or throughput, and/or increasing the amount of memory provided by or to controller node 102. In some cases, system 100 can be scaled horizontally by increasing the number of processing (e.g., CPU) instances, such as by increasing the number of instances of virtual machines associated with worker services 118 and/or task management services 120, thus allowing more task consumer services to be run. For instance, when increasing the number of processing instances of worker services 118 for horizontal scaling, system 100 may implement worker processes as separate threads, and individual threads may, in some cases, access a global interpreter lock before performing actions on select shared resources. The described techniques may, in many cases, leverage parallelization to scale the management of data center resources, such as nodes, storage volumes, and application containers. In some instances, the techniques may provide a suitable platform for certain tasks such as automated administration of managed data center resources via artificial intelligence.

As described previously, the techniques described herein may enable breaking the business logic found in certain micro-service application programming interface (API) request handlers into discrete, composable tasks, which allows workflows to be composed and handled. In certain cases, these workflows may include sequential chains of dependent tasks and groups of one or more independent tasks that may be executed at least partially in parallel. For certain cases in which a given task includes a sequential chain of multiple subtasks, worker processes may thus be configured to execute the sequential chain of subtasks in parallel with other independent tasks. The workflows, being tasks themselves, can be chained and/or grouped for execution, as well.

Figure 2:
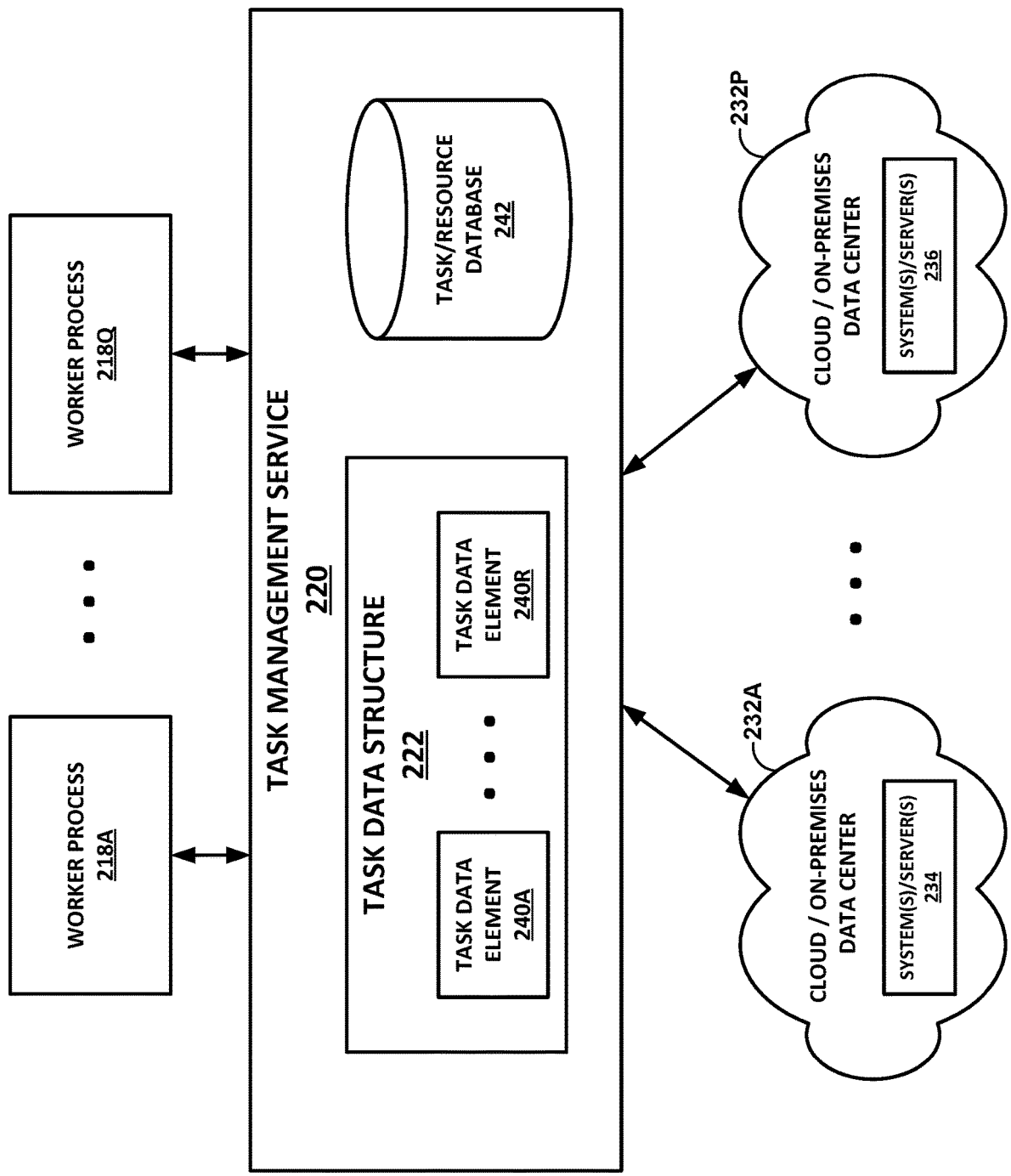
FIG. 2 is a block diagram illustrating example task data elements that are added to a task data structure and that may be handled by one or more worker processes, in accordance with one or more techniques of the disclosure.

FIG. 2 is a block diagram illustrating example task data elements 240A-240R (collectively, task data elements 240") that have been added to a task data structure 22 and that may be handled by one or more worker processes 218A-218Q (collectively, "worker processes 218"), in accordance with one or more techniques of the disclosure. In FIG. 2, worker processes 218 may be included in or provided by one or more worker services, such as worker services 118 shown in FIG. 1. In some examples, one or more of worker processes 218 may execute as background processes. Task management service 220 may be one example of task management services 120 shown in FIG. 1. Task data structure 222 may be one example of task data structures 122 shown in FIG. 1.

Data centers 232A-232P (collectively, "data centers 232") may be one example of data centers 132 shown in FIG. 1. Each of data centers 232 may comprise a cloud or an on-premises data center, similar to data centers 132, and each of data centers 232 may be located in one or more geographical locations. In addition, each of data centers 232 may include one or more storage systems and/or servers. As shown in the example of FIG. 2, data center 232A includes one or more systems/servers 234, and data center 232P includes one or more systems/servers 236.

Similar to the description above of FIG. 1, task management service 220 may receive, from a client device via a web service (e.g., client device 138 via web service 104), a resource management request associated with one or more resources provided by at least one of data centers 232. The one or more resources may comprise at least one node, storage volume, or application container provided by data centers 232. In various examples, the resource management request may comprise a node creation request, a node deletion request, a storage volume creation request, a storage volume deletion request, an application container creation request, or an application container deletion request associated with the one or more resources provided by one or more of data centers 232.

Task management service 220 may then create, based on the resource management request, a group of task data elements 240 that are collectively assigned to the resource management request. For example, if the resource management request may indicate or otherwise be associated with two items or tasks/subtasks, task management service 220 may create a first task data element 240A and a second task data element 240R.

Task management service 220 is configured to add task data elements 240, including task data element 240A and task data element 240R, to task data structure 222. Task data structure 222 is accessible a group of worker processes 218.

Worker processes 218 may include worker process 218A and 218Q illustrated in FIG. 2, and task data structure 222 may be accessible at least to these worker processes 218A land 218Q. In some examples, each of worker processes 218 are executed by a respective processor in the system (e.g., system 100 shown in FIG. 1). Each respective processor may comprise a hardware processor or a virtual processor/machine (e.g., one of nodes 112 of FIG. 1 configured as a virtual machine).

In certain examples, task data structure 222 may comprise a task queue. In these examples, any individual ones of task data elements 240 are added to the back of the queue. Thus, if the queue is initially empty, task management service 220 may first add task data element 240A to the back of the queue. Afterwards, task management service 220 may add task data element 240R to the back of the queue. In other examples, task data structure 222 may have different formats or structures. For instance, task data structure 222 may comprise a task stack. In this case, task data structure 222 may add any new ones of task data elements 240 to the top of the stack.

When any of worker processes 218 are available to handle a new task, these worker processes 218 may access task data structure to remove one of task data elements 240 from task data structure 222. One of worker processes 218 may become available if it is not currently processing any other tasks, if it is idle, or if it otherwise has bandwidth and/or capacity to process one or more new tasks. In the example of FIG. 2, worker process 218A may be or become available to handle a new task at a particular point in time. Worker process 218A removes a first task data element 240A from task data structure 222 and may initiate execution of a first task associated with first task data element 240A. In examples where task data structure 222 comprise a task queue, which has a first-in-first-out mechanism of operation, worker process 218A may remove or dequeue first task data element 240A from the queue if first task data element 240A is at the front of the queue. In other examples where task data structure 222 comprises a task stack, which has a last-in-first-out mechanism of operation, worker process 218A may remove or pop first task data element 240A from the stack if first task data element 240A is at the top of the stack.

Similarly, at a later point, worker process 218Q may be or become available to handle a new task. Worker process 218Q may remove a second task data element 240R from task data structure 222, given that task data element 240A was previously removed from task data structure 222 by worker process 218A. Upon removal of second task data element 240R, worker process 218Q may initiate execution of a second task associated with second task data element 240R. In such fashion, second worker process 218Q is capable of executing at least a portion of the second task while first worker process 218A executes at least a portion of the first task in parallel. Task management service 220 and/or worker processes 218 therefore do not necessarily need to block or wait for certain tasks to complete prior to initiating execution of other tasks, and worker processes 218 are instead enabled to execute tasks at least partially in parallel based upon the availability of worker processes 218 over time.

Upon initiating execution of the first and second tasks by worker process 218A and worker process 218B, task management service 220 may provide a response indicating a status of the first and second tasks to the client device (e.g., client device 138 via web services 104, shown in FIG. 1). The client device may then process the response to determine the status of these tasks. In various examples, task management service 220 may store the status of one or more tasks, and/or the status of one or more resources provided by data centers 232, in task/resource database 242. The response that is provided by task management service 220 may include a link to the status of the first and second tasks as stored in task/resource database 242.

Task management service 220 may provide the response back to the client device prior to completion of execution of these tasks. The link, however, may comprise a reference (e.g., URL link) to a document or page that is managed and updated by task management services based on the current status information associated with the tasks, as stored in task/resource database 242. Task management services 120 may periodically update the document or page referenced by this link, based on task and/or resource status changes indicated in task/resource database 242, and the client device may monitor the link to obtain an updated status of task execution. In other examples, task management service 220 may provide one or more updated responses to the client device upon completion or termination of the execution of the first and/or second tasks. The response(s) may include information associated with the successful or unsuccessful completion of these tasks. Upon completion of the tasks, task management service 220 may also update task/resource database 242 to indicate the results of these tasks. The state of managed resources such as nodes, storage, and containers may also be refreshed periodically and stored in task/resource database 242.

In certain examples, any particular task or workflow executed by worker processes 218 may include a sequence of two or more subtasks having a defined order. For instance, a workflow may include a sequence or series of dependent subtasks that are to be completed in the defined order (e.g., creating an instance of a node, provisioning/registering/configuring the node or data associated with the node, creating certificates, creating/loading VPN configurations, creating one or more storage volumes for file systems, etc.). In these examples, the task data element (e.g., task data element 240A) in task data structure 222 that corresponds to a task or workflow having the two or more subtasks may include information associated with the sequence of these two or more subtasks. The worker process (e.g., worker process 218A) that initiates execution of the task or workflow may then, upon removing the task data element from task data structure 222, initiate execution of at least one subtask of the sequence of the two or more subtasks having the defined order. The information associated with the sequence may indicate the specific ordering of the subtasks that are to be performed to complete the workflow. Once a given worker process has completed performance of one particular subtask in the workflow, the worker process may update task/resource database 242 to update the completion status of this subtask. That same worker process or any other available worker process from worker processes 218 may then initiate execution of the next subtask in the sequence. This process may be continued until all subtasks in the sequence have been performed. Individual work processes may not initiate a particular subtask until the earlier subtask in the sequence has been successfully completed. Any one of processes 218 may check task/resource database 242 to determine the completion status of any particular subtask in the sequence for the given workflow.

In some examples, where a particular workflow includes a sequence of two or more subtasks having a defined order, task management service 220 may create a respective task data element for each subtask. For example, if the workflow includes a sequence of two subtasks having a defined order, task management service 220 may create task data element 240A for a first subtask, and may create task data element 240B for a second subtask, which are both added to task data structure 222. Task management service 220 may include information in task/resource database 242 and/or within task data elements 240A, 240B to indicate that the corresponding first and second subtasks are part of a particular workflow. For example, this information may include a unique workflow identifier that associates the first and second subtasks with the same workflow. This information may also include subtask ordering information for the workflow. For example, this information may further indicate that the first subtask associated with task data element 240A is the first subtask in the workflow (e.g., first in the sequence), and that the second subtask associated with task data element 240B is the second subtask in the workflow (e.g., second in the sequence), which is to be performed after the first subtask is complete. In general, workflow and/or task status information may also be stored in task/resource database 242.

An available worker process (e.g., worker process 218A) may then access task/resource database 242 to identify information about the workflow, including the subtask ordering information for subtasks associated with the workflow, and also status information. This worker process may determine that the first subtask, which is associated with task data element 240A, has not yet been completed, and may then remove task data element 240A for the first subtask from task data structure 222, and initiate execution of this first subtask. Upon completion of the first subtask, the worker process and/or task management service 220 may update the status of the workflow, and the completion of the first subtask, in task/resource database 242. Any available worker processes (e.g., worker process 218A or 218B) may then access task/resource database 242 to identify that the first subtask is completed, and that the second subtask, which is associated with task data element 240B, is not yet completed. This worker process may then remove task data element 240B from task data structure 222 and initiate execution of this second subtask. However, based on the workflow and task status information in task/resource database 242, the worker process will not remove task data element 240B from task data structure 222 until it has determined that the first subtask is complete, based on information in task/resource database 242 and the defined order associated with the workflow. Upon completion of the second subtask, the worker process and/or task management service 220 may update the status of the workflow, and the completion of the second subtask, in task/resource database 242.

As indicated in FIG. 2, task data structure 222 may include any number of task data elements 240. The description above outlines examples of task data structure 222 including at least two task data elements. Task data structure 222 may, in some cases, include at least a third task data element that is accessible by at least a third worker process of worker processes. When this third worker process is available to handle one or more tasks, the third worker process may remove the third task data element from task data structure 222, and may initiate execution of a third task associated with the third task data element.

As described above, task/resource database 242 shown in FIG. 2 may include information about workflows, tasks that are executed by worker processes 218, as well as resource information for resources (e.g., nodes, storage volumes, application containers) provided by data centers 232 that are associated with these tasks. In various examples, task management service 220 may periodically update a resource status of these resources, and make these updates available to external client devices (e.g., client devices 138 shown in FIG. 1).

In certain cases, execution of one or more tasks may not complete successfully and fail. In these cases, task management service 220 may update task/resource database 242 to indicate the failure status, which may also be accessible to the client device (e.g., via access to information provided by task/resource database 242 or via response data provided back to the client device). Task management service 220 may also be configured to roll back or undo any changes that were initiated by the failed tasks. For example, if one of worker processes 218 attempted to execute a task to add a new node to the system, and this task was unsuccessful, task management service 220 may delete this node or roll back any changes that were made by this worker process in its unsuccessful attempt to add the new node.

Figure 3A:
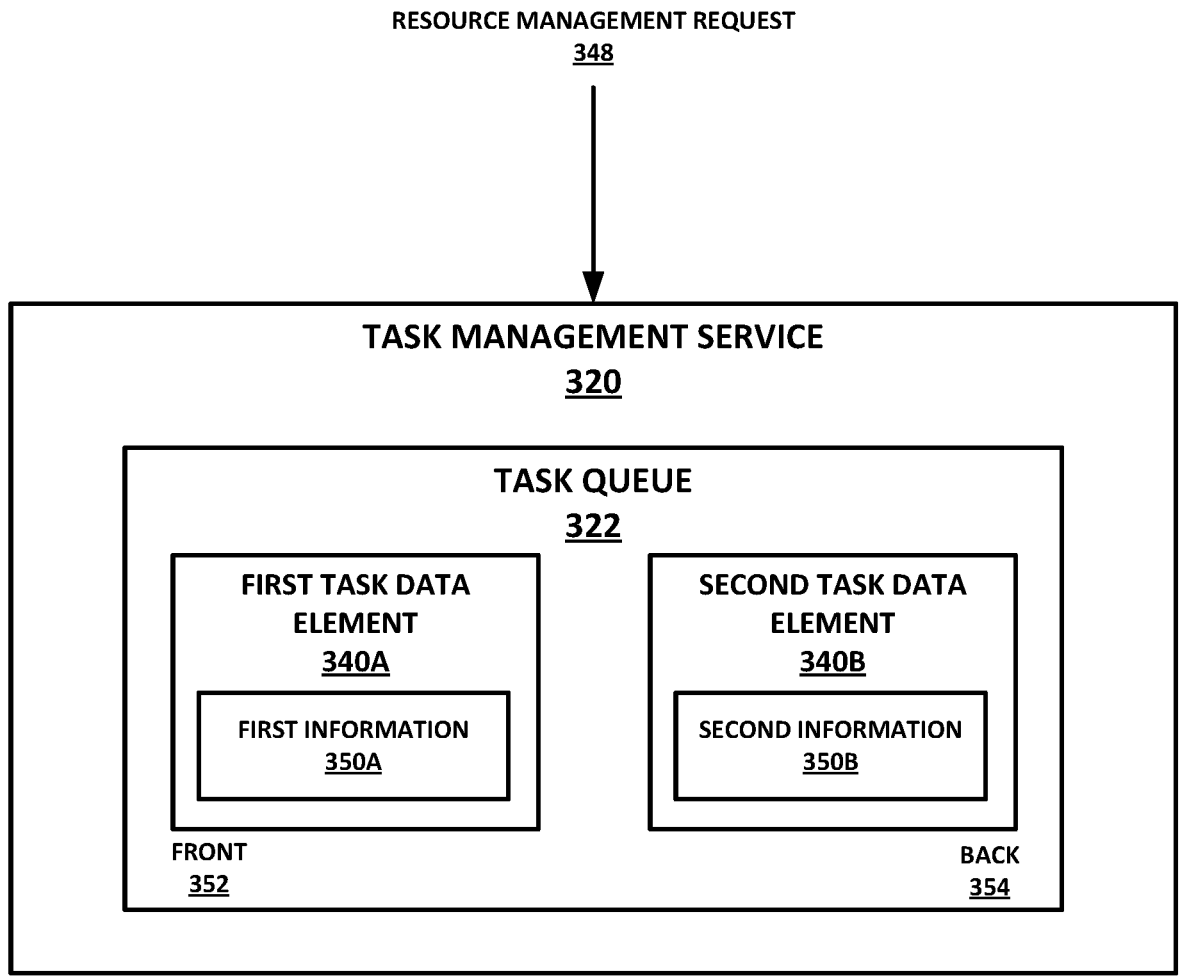
FIGS. 3A-3C are block diagrams illustrating example processing of an incoming resource management request, in accordance with one or more techniques of the disclosure.
Figure 3B:
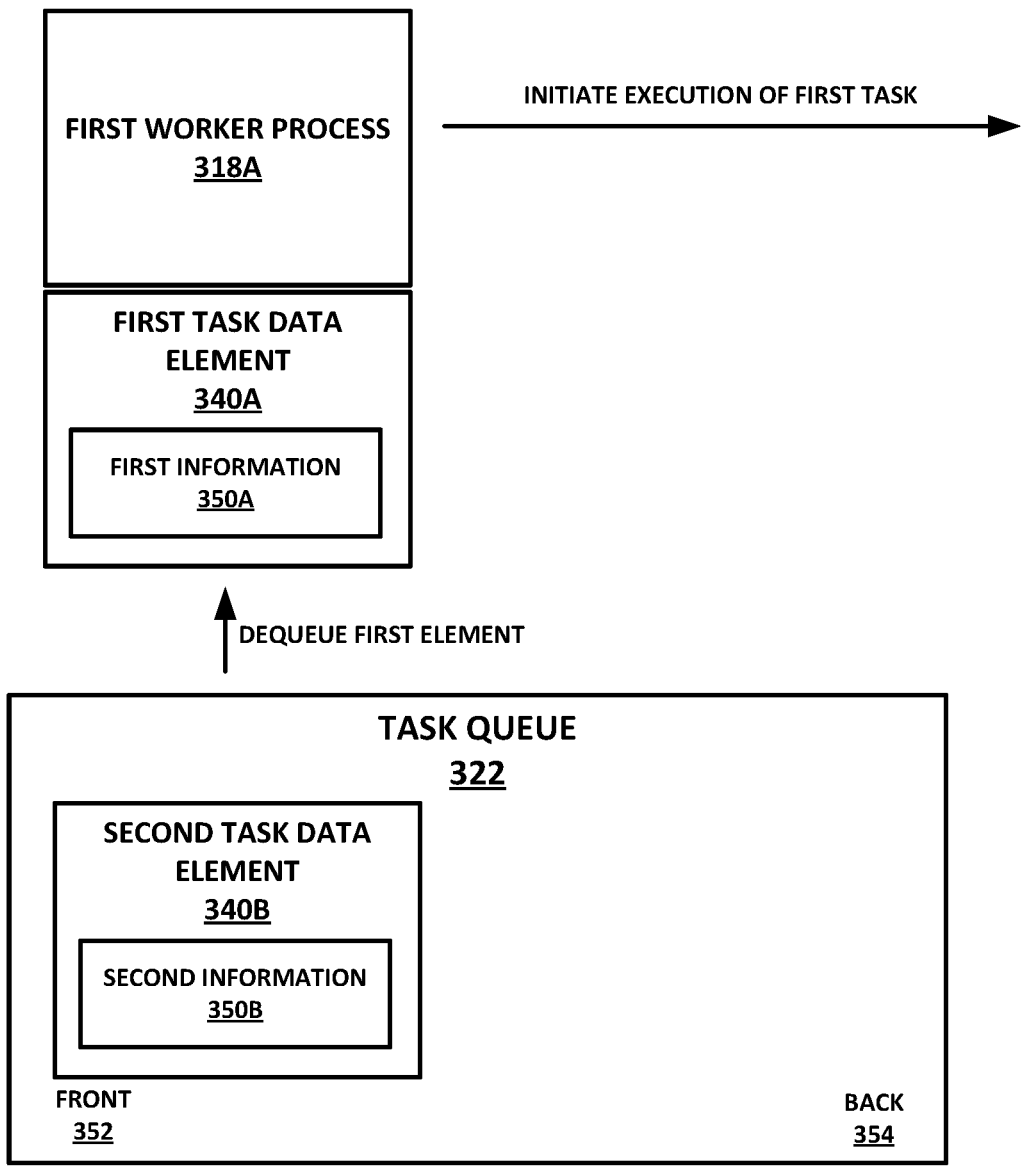
Figure 3C:
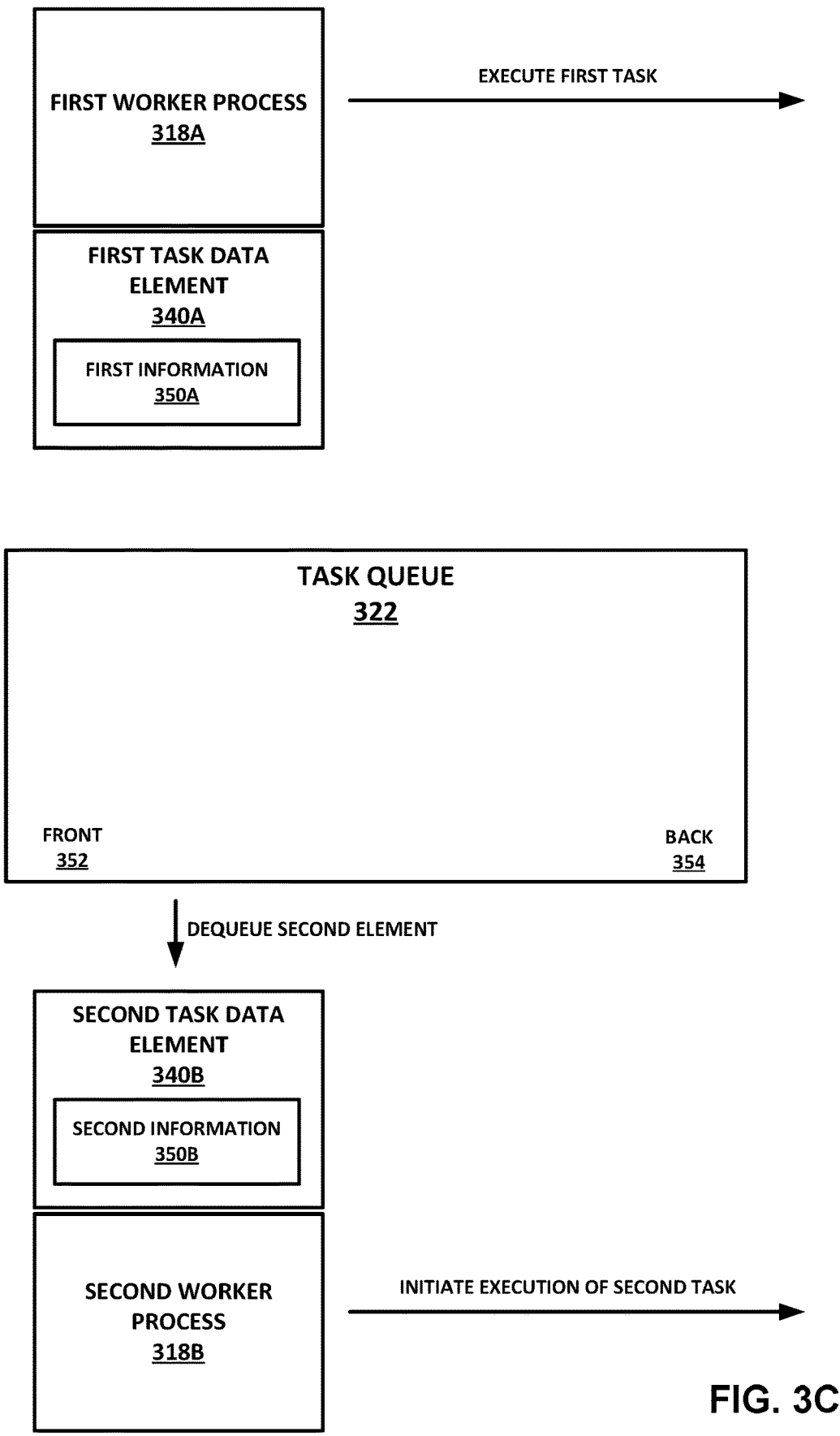

FIGS. 3A-3C are block diagrams illustrating an example of the processing of an incoming resource management request 348, the creation and addition of corresponding task data elements 340A and 340B to a task queue 322, the removal of these task data elements 340A and 340B from task queue 322 by respective worker processes 318A and 318B, respectively, and the execution of corresponding tasks by worker processes 318A and 318B, in accordance with one or more techniques of the disclosure. Tash queue 322 may be one example of a task data structure, such as task data structure 122 (FIG. 1) and/or task data structure 222 (FIG. 2), which is managed by task management service 320. Task management service 320 may be one example of task management service 120 (FIG. 1) and/or task management service 220 (FIG. 2).

In FIG. 3A, it is assumed that a controller node, such as controller node 102 shown in FIG. 1, receives an incoming resource management request 348 from an external client device, such as client device 138. For example, web services 104 of FIG. 1 may receive resource management request 348 and provide this request to task management services 320, which manages task queue 322. As noted above, task queue 322 is one example of a task data structure. In other examples, other forms of data structures may be implemented, such as a task stack.

Resource management request 348 may be associated with one or more resources that are provided by one or more data centers, such as data centers 132 illustrated in FIG. 1. These resources may include one or more nodes, storage volumes, or application containers provided by the at least one data center. Task management service 320 may create, based on resource management request 348, a first task data element 340A and a second task data element 340B that are collectively assigned to resource management request 348. For instance, if resource management request 348 comprises a client request to create two new nodes (e.g., node 112A and 112M shown in FIG. 1), task management service 320 may parse resource management request 348 and create task data elements 340A and 340B which correspond to the creation of these two new nodes. First task data element 340A may be associated with a first task to create the first new node, while second task data element 340B may be associated with a second task to create the second new node.

Task management service 320 may add both of first task data element 340A and second task data element 340B to task queue, as illustrated in FIG. 3A. Task queue 322 has both a front 352 and a back 354. Task queue 322 operates in a first-in, first-out (FIFO) basis. Thus, a new task data element is added to back 354 of task queue 322, and a task data element located at front 352 of task queue 322 is the first task data element to be removed from task queue 322. In the example of FIG. 3A, it is assumed that task management service 320 first adds first task data element 340A and then adds second task data element 340B to task queue 322. Given the FIFO structure of task queue 322, and assuming that these are the only elements in task queue 322, first task data element 340A is located at front 352 of task queue 322, and second task data element 340B is located at back 354 of task queue 322.

Each task data element includes corresponding information for the task associated with that respective task data element. For instance, as shown in FIG. 3A, first task data element 340A includes first information 350A, and second task data element 340B includes second information 350B. First information 350A and second information 350B may be included in resource management request 348, or may be generated by task management service 320 based on information included in resource management request.

For instance, if resource management request 348 includes a request to create two new nodes, resource management request 348 may include first information 350A for creating a first new node, and second information 350B for creating a second new node. Task management service 320 may then provide first information 350A for storage in first task data element 340A, and provide second information 350B for storage in second task data element 340B.

As one example, first information 350A may include an identifier of the first new node that is to be created, an identifier of a particular data center that provides the first node (e.g., one of data centers 132), and/or one or more security credentials associated with particular data center providing the first node. The security credentials may include a user name and/or password to access resources on the particular data center. In some cases, the security credentials may include a secure shell (SSH) key. The second information 350B may include an identifier of the second new node that is to be created, an identifier of a particular data center that provides the second node, and/or one or more security credentials associated with particular data center providing the second node.

In some cases, due to the sensitive nature of the data associated with the security credentials, a client device may provide the security credentials to the controller node (e.g., controller node 102), including any services provided by the controller node (e.g., task management service 320), via a virtual private network (VPN). In these cases, the client device may include the security credentials in resource management request 348, or may alternatively provide the security credentials in a separate communication that is associated with resource management request 348 (e.g., via request identifier).

As shown in FIG. 3B, a first worker process 318A, such as a worker process provided by worker services (e.g., worker services 118) and/or an example of worker process 218A, has access to task queue 322. In various examples, task management service 320 may utilize a publish-subscribe model for elements that are added to task queue 322. For example, when any data element such as first task data element 340A and/or 340B is added to task queue 322, task management service 320 may publish one or more events corresponding to the addition of these elements. For instance, when first task data element 340A is added to task queue 322, task management service 320 may publish a first event. When second task data element 340B is added to task queue 322, task management service 320 may publish a second event.

Any number of worker processes may subscribe to events associated with task queue 322 that are generated or published by task management service 320, and these worker processes may receive notifications of such events when they are generated or published. Thus, in FIG. 3B, if such a publish-subscribe model is used, first worker process 318A may subscribe to events published by task management service 320 corresponding to addition of elements to task queue 322. First worker process 318A may then receive one or more event notifications when first task data element 340A and second task data element 340B are added to task queue 322. When first worker process 318A is available to handle one or more tasks, it may remove a task data element located at front 352 of task queue 322.

For instance, first worker process 318A may become available if it is not currently processing any other tasks, if it is idle, or if it otherwise has bandwidth and/or capacity to process one or more new tasks. Because first task data element 340A is located at front 352 of task queue 322 in FIG. 3A, first worker process 318A removes (e.g., dequeues) this first task data element 340A from front 352 of task queue 322. In FIG. 3B, first worker process 318A has removed first task data element 340A from task queue 322, and second task data element 340B is moved from back 354 to front 352 of task queue 322. For example, task queue 322 and/or task management service 320 may manage the positions and orderings of elements in task queue 322, and may re-position second task data element 340B to front 352 of task queue 322.

Once first worker process 318A has removed first task data element 340A from task queue 322, it may then initiate execution of the first task associated with first task data element 340A using first information 350A. For example, continuing with the example above, if the first task data element 340A is associated with the task of creating a first new node, first worker process 318A may initiate the execution of the task of creating this first new node based on first information 350A (e.g., identifier of the first new node, identifier of a particular data center that provides the first node, security credentials).

After first worker process 318A has initiated execution of this first task, a second worker process 318B may become available to handle tasks, as illustrated in FIG. 3C. Second worker process 318B also has access to task queue 322. As noted above, in certain examples, when a publish-subscribe model is used, second worker process 318B may also receive notifications when elements are added to task queue 322. When second worker process 318B is available to handle one or more tasks, and if it determines that task queue 322 is not currently empty, it may remove a task data element located at front 352 of task queue 322. Because second task data element 340B is located at front 352 of task queue 322, second worker process 318B removes (e.g., dequeues) this second task data element 340B from front 352 of task queue 322. As shown in FIG. 3C, second worker process 318B has removed second task data element 340B from task queue 322, task queue 322 is empty.

Once second worker process 318B has removed second task data element 340B from task queue 322, it may then initiate execution of the second task associated with second task data element 340B using second information 350B. Continuing with the example above, if the second task data element 340B is associated with the task of creating a second new node, second worker process 318B may initiate the execution of the task of creating this second new node based on second information 350B (e.g., identifier of the second new node, identifier of a particular data center that provides the second node, security credentials). As a result, second worker process 318B may be enabled to execute at least a portion of the second task for creating this second node while first worker process 118A executes in parallel at least a portion of the first task for creating the first node.

Task management service 320 may send to the client device (e.g., to client device 138 via web services 104 shown in FIG. 1) a response to resource management request 348. This response is associated with an execution status of the first and second tasks. Different worker processes provided by worker services 118 are capable of asynchronously removing the task data elements from task data structures 122 provided by task management services 120 and executing corresponding tasks associated with the resource management requests as these worker processes become available.

As a result, first worker process 318A and 318B may be capable of executing these first and second tasks at least partially in parallel, such that the management of data center resources is not necessarily bottlenecked by worker processes 318A or 318B or other system services being able to handle only one task and/or resource management request at a time. Thus, the techniques described herein may enable at least partial parallelization of task and workflow execution to improve the scaling and management of data center resources.

Figure 4:
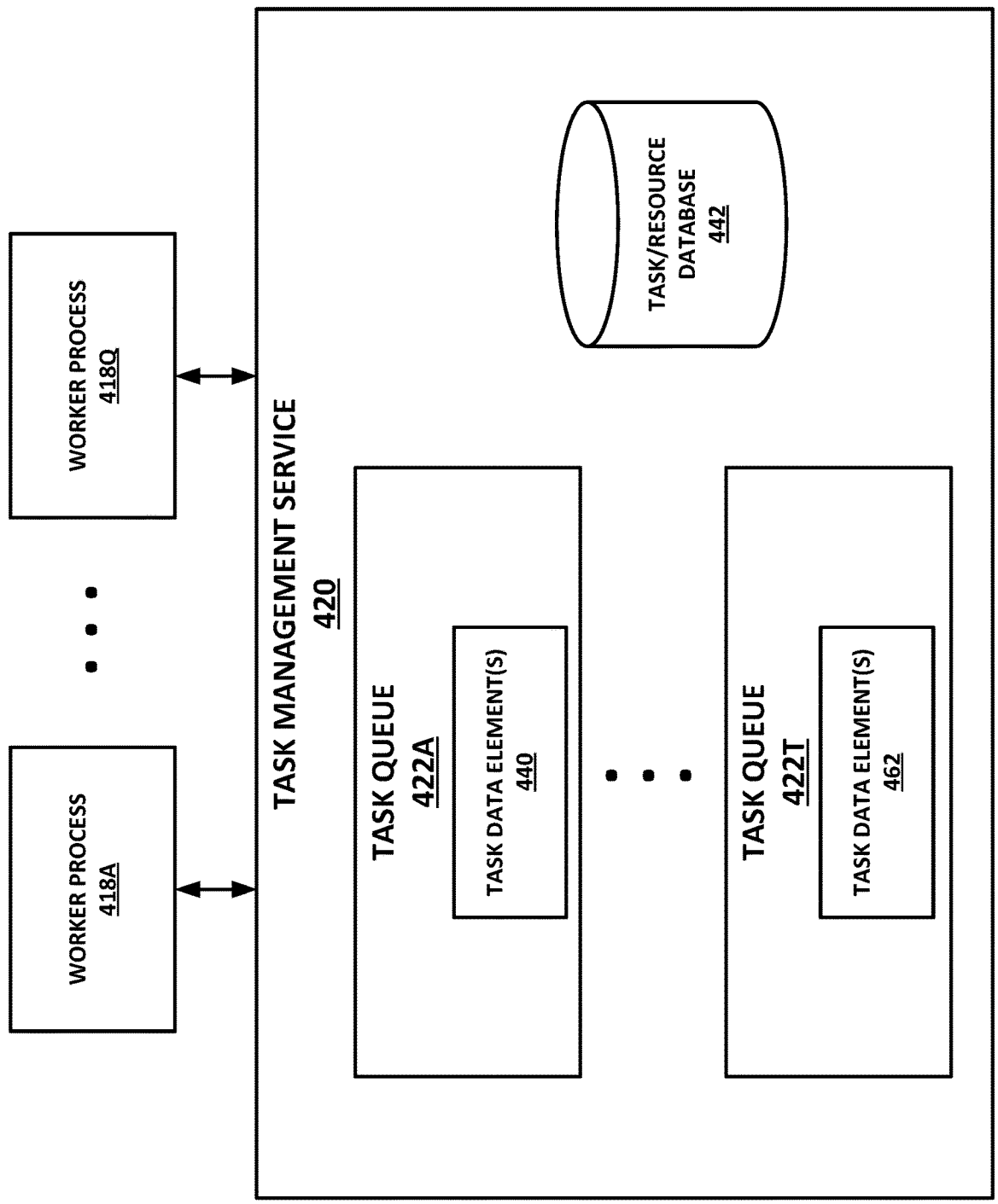
FIG. 4 is a block diagram illustrating an example of multiple task queues that are accessible by worker processes, in accordance with one or more techniques of the disclosure.

FIG. 4 is a block diagram illustrating an example of multiple task queues that are accessible by worker processes, in accordance with one or more techniques of the disclosure. FIG. 4 illustrates an example of a task management service 420 that includes task/resource database 442 and multiple task queues 422A-422T (collectively, "task queues 422"). Task management service 420 may be one example of task management service 120 (FIG. 1), task management service 220 (FIG. 2), and/or task management service 320 (FIG. 3). Task/resource database 442 may be one example of task/resource database 242 (FIG. 2). Each of task queues 422 may be an example of task data structure 122 (FIG. 1), task data structure 222 (FIG. 2), and/or task queue 322 (FIG. 3).

Various worker processes 418A-418Q (collectively, "worker processes 418") may be communicatively coupled to task management service 420, and may each have access to task queues 422. Worker processes 418 may be one example of worker services 118 (FIG. 2), worker processes 218 (FIG. 2), and/or worker processes 318A/318B (FIG. 3). In certain examples, such as the one illustrated in FIG. 4, task management services 420 may implement multiple task queues 422 to manage the processing of different types of events that may be executed by worker processes 418.

For example, certain tasks may be long-running and/or or time-consuming tasks, while other tasks may be short-running tasks. Long-running tasks may be those that are more complicated in nature and/or that take an extended period of time to execute, while short-running tasks may be those that are more simple in nature and/or that take a shorter period of time to execute. Rather than adding task data elements associated with all of these types of tasks into a single task queue, task management service 420 may add task data elements (e.g., one or more task data elements 440) that are associated with long-running tasks to a first task queue (e.g., task queue 422A), and may add task data elements (e.g., one or more task data elements 462) that are associated with short-running tasks to a second task queue (e.g., task queue 422T). Worker processes 418 may have access to all of queues 422, but may be configured to identify task queue 422A as a queue that includes task data elements 440 for long-running tasks, and to identify task queue 422T as a queue that includes task data elements 462 for shorter-running tasks.

Based on the types, current processing capabilities, and/or available bandwidth of worker processes 418, these worker processes may determine whether to process task data elements 440 from task queue 422A or task data elements 462 from task queue 422T, such as via the publish-subscribe model described above when task management service 420 adds elements to task queue 422A and/or 422T. In such fashion, continuing with the example described above, any of worker processes 418 that are currently able or configured to handle long-running tasks may remove task data elements 440 from task queue 422A, and any of worker processes that are currently able to configured to handle short-running tasks may remove task data elements 462 from task queue 422T. The processing of elements from task queues 422 may occur in response to task management service 420 receiving one or more resource management requests from a client device (e.g., from client device 138 via web services 104, illustrated in FIG. 1).

For instance, task management service 420 may receive a first resource management request associated with a first group of resources provided by a data center (e.g., one of data centers 132 shown in FIG. 1). Task management service 420 may process this first resource management request and determine that it is associated with one or more longer-running tasks that are more complex or will take a longer period of time to execute. As a result, task management service 420 may create one or more task data elements 440 based on this first resource management request, and may add these task data elements 440 to task queue 422A.

Task management service 420 may also receive a second resource management request associated with a second group of resources provided by a data center (e.g., one of data centers 132 shown in FIG. 1). Task management service 420 may process this second resource management request and determine that it is associated with one or more shorter-running tasks that are less complex or that will take a longer period of time to execute. As a result, task management service 420 may create one or more task data elements 462 based on this second resource management request, and may add these task data elements 462 to task queue 422T.

Worker processes 418 may then remove elements from task queues 422A and/or 422T based on the types of these processes 418, their current processing capabilities, and/or their current available bandwidth. Thus, any of worker processes 418 that are currently able or configured to handle long-running tasks may remove task data elements 440 from task queue 422A and initiate execution of corresponding tasks, and any of worker processes that are currently able to configured to handle short-running tasks may remove task data elements 462 from task queue 422T and initiate execution of corresponding tasks. Task management service 420 may then send one or more responses back to the client device in response to the first and second resource management requests in order to provide a status of the corresponding tasks whose execution has been initiated by worker processes 418. Task management service 420 may also store task status and/or resource status information in task/resource database 442, and may also periodically update the task and/or resource status information as tasks are being executed and completed by worker processes 418.

Figure 5:
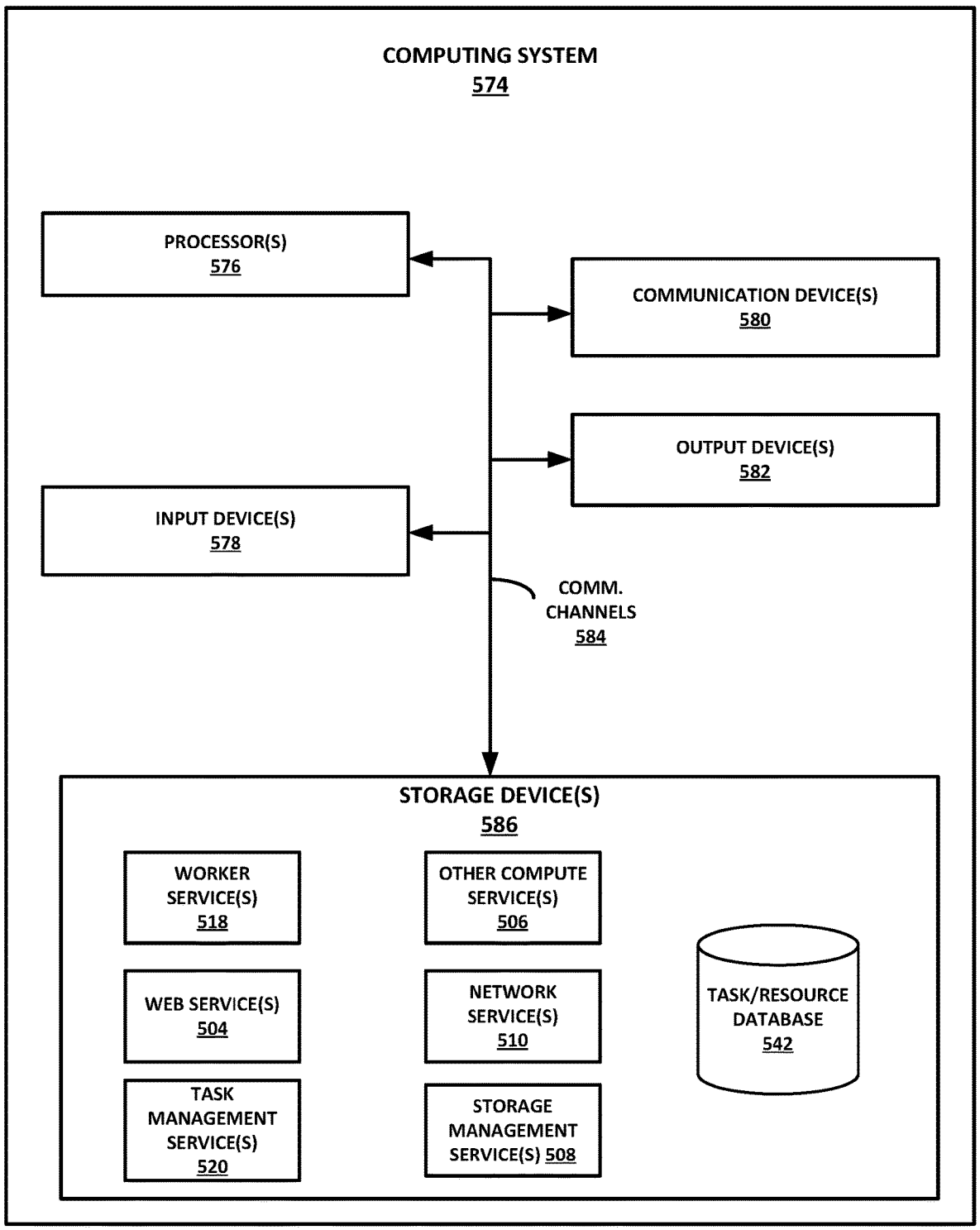
FIG. 5 is a block diagram illustrating an example computing system, in accordance with one or more techniques of the disclosure.

FIG. 5 is a block diagram illustrating an example computing system 574, in accordance with one or more techniques of the disclosure. Computing system 574 may include or implement one or more of the nodes, containers, applications, and/or services described herein and shown in FIGS. 1-2, FIGS. 3A-3C, and/or FIG. 4, such as one or more of nodes 112, controller node 102, application containers 114, web services 104, compute services 106, worker services 118, network services 110, storage management services 108, task management services 120, worker processes 218, task management service 220, work processes 318, worker processes 418, and/or task management service 420. FIG. 5 illustrates only one particular example of computing system 574, and many other examples of computing system 574 may be used in other instances and may include a subset of the components shown, or may include additional components not shown, in FIG. 5.

As shown in the example of FIG. 5, computing system 574 includes one or more processors 576, one or more input devices 578, one or more communication devices 580, one or more output devices 582, and one or more storage devices 586. In some examples, computing system 574 may not include input devices 578 and/or output devices 582. Communication channels 584 may interconnect each of the components 576, 580, 578, 582, and 586 for inter-component communications (physically, communicatively, and/or operatively). In some examples, communication channels 584 may include a system bus, a network connection, an inter-process communication data structure, or any other method for communicating data between hardware and/or software.

One or more input devices 578 of computing system 574 may receive input.

Examples of input are tactile, audio, and video input. Examples of input devices 578 include a presence-sensitive screen, touch-sensitive screen, mouse, keyboard, voice responsive system, video camera, microphone or any other type of device for detecting input from a human or machine.

One or more output devices 582 of computing system 574 may generate output. Examples of output are tactile, audio, and video output. Examples of output devices 582 include a presence-sensitive screen, sound card, video graphics adapter card, speaker, cathode ray tube (CRT) monitor, liquid crystal display (LCD), or any other type of device for generating output to a human or machine. Output devices 582 may include display devices such as cathode ray tube (CRT) monitor, liquid crystal display (LCD), or any other type of device for generating tactile, audio, and/or visual output.

One or more communication devices 580 of computing system 574 may communicate with one or more other computing systems or devices via one or more networks by transmitting and/or receiving network signals on the one or more networks. Examples of communication devices 580 include a network interface card (e.g. such as an Ethernet card), an optical transceiver, a radio frequency transceiver, or any other type of device that can send and/or receive information, such as through a wired or wireless network. Other examples of communication devices 580 may include short wave radios, cellular data radios, wireless Ethernet network radios, as well as universal serial bus (USB) controllers.

One or more storage devices 586 within computing system 574 may store information for processing during operation of computing system 574 (e.g., computing system 574 may store data accessed by one or more modules, processes, applications, services, nodes, application containers, or the like during execution at computing system 574). In some examples, storage devices 586 on computing system 574 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 586 may include redundant array of independent disks (RAID) configurations and one or more solid-state drives (SSD's).

Storage devices 586, in some examples, also include one or more computer-readable storage media. Storage devices 586 may be configured to store larger amounts of information than volatile memory. Storage devices 586 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 586 may store program instructions and/or data associated with one or more software/firmware elements or modules.

For example, storage devices 586 may store one or more worker services 518, web services 504, task management services 520, network services 510, storage management services 508, and other compute services 506 (e.g., such as when storage devices 586 stores information for controller node 102). Storage devices 586 may also store a task/resource database 542. The components stored in storage devices 586 may be examples of similarly named components shown in FIGS. 1-2, FIGS. 3A-3C, and/or FIG. 4.

Computing system 474 further includes one or more processors 576 that may implement functionality and/or execute instructions within computing system 574. For example, processors 576 may receive and execute instructions stored by storage devices 586 that execute the functionality of the elements and/or modules described herein. These instructions executed by processors 576 may cause computing system 574 to store information within storage devices 586 during program execution. Processors 576 may also execute instructions of an operating system to perform one or more operations described herein.

Figure 6:
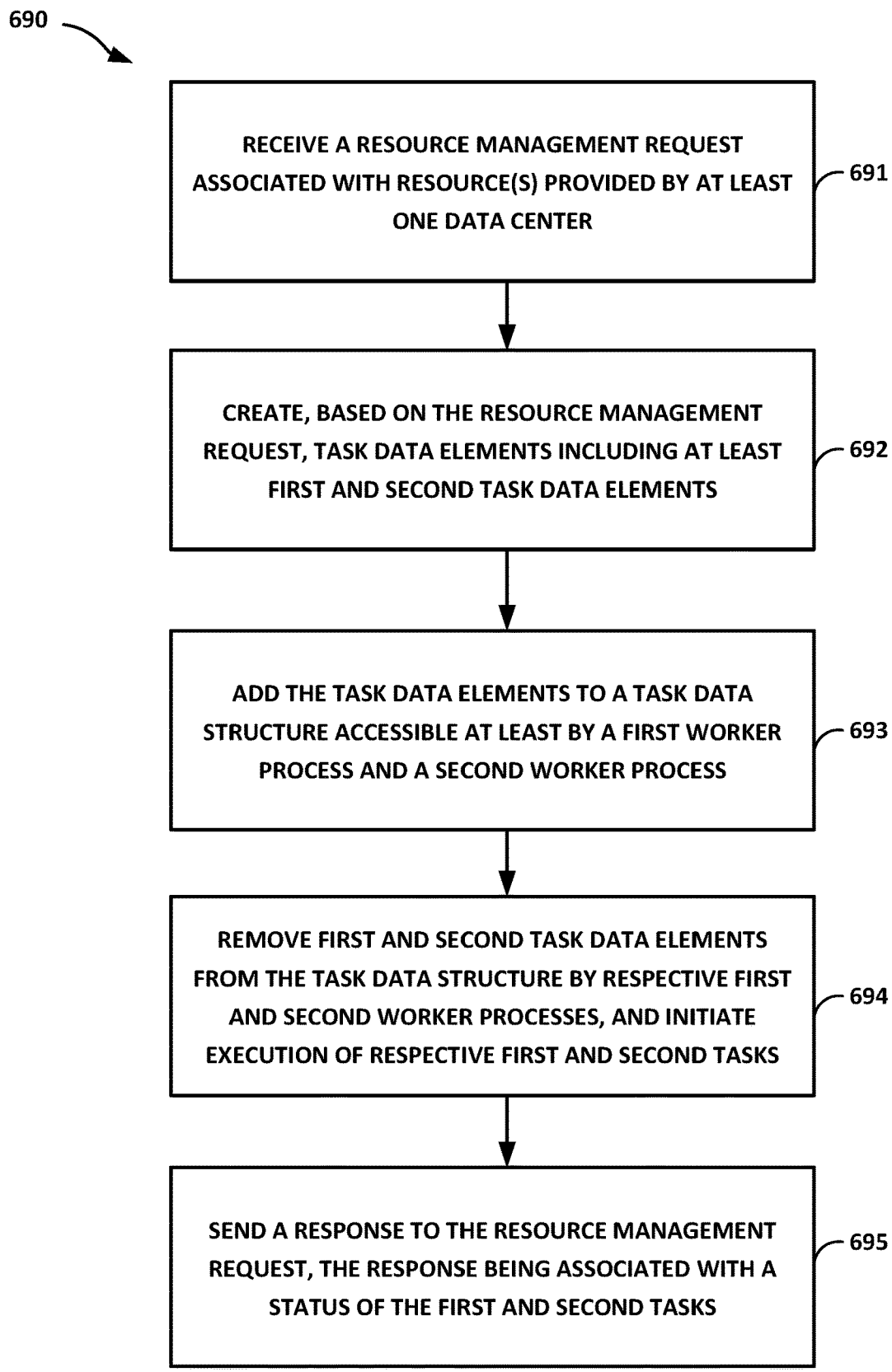
FIG. 6 is a flow diagram illustrating an example process to add task data elements to a task data structure and initiate execution of corresponding tasks, in accordance with one or more techniques of the disclosure.

FIG. 6 is a flow diagram illustrating an example process 690 to add task data elements to a task data structure and execute corresponding tasks, in accordance with one or more techniques of the disclosure. In various cases, process 690 may be performed by one or more services of a controller node (e.g., controller node 102 of FIG. 1), such as one or more task management services (e.g., task management services 120) and/or one or more worker services (worker services 118).

In the example of FIG. 6, process 690 includes receiving (691), from a client device (e.g., client device 138), a resource management request associated with one or more resources provided by at least one data center (e.g., at least one of data centers 132). Process 690 further includes creating (692), based on the resource management request, task data elements that include at least a first task data element and a second task data element.

Process 690 further includes adding (693) the task data elements to a task data structure (e.g., task data structure 122). This task data structure is accessible at least by a first worker process and a second worker process (e.g., worker processes provided by worker services 118). Process 690 further includes removing (694), by the first worker process, the first task data element from the task data structure and initiating execution of a first task associated with the first task data element, and, after removing the first task data element by the first worker process, removing, by the second worker process, the second task data element from the task data structure and initiating execution of a second task associated with the second task data element. The second worker process may be configured to execute at least a portion of the second task while the first worker process executes at least a portion of the first task in parallel. Process 690 further includes sending (695), to the client computing device, a response to the resource management request, where the response is associated with a respective status of each of the first and second tasks.

In some examples, process 690 further includes storing the respective status of each of the first and second tasks in a database (e.g., task/resource database 242). In these examples, sending the response to the resource management request includes sending, to the client computing device, a link to the respective status of each of the first and second tasks as stored in the database. Responsive to completion of the first task, a task management service (e.g., task management service 220) updates the status of the first task in the database to indicate one or more results of the first task, and, responsive to completion of the second task, updates the status of the second task in the database to indicate one or more results of the second task.

In some examples, the one or more resources include at least one node, storage volume, or application container provided by the at least one data center. Receiving the resource management request includes receiving, from the client device, one or more of a node creation request, a node deletion request, a storage volume creation request, a storage volume deletion request, an application container creation request, or an application container deletion request associated with the one or more resources provided by the at least one data center.

In certain cases, receiving the resource management request may include receiving, from the client device, the node creation request to create first and second nodes (e.g., nodes 112A and 112M) that are provided by the at least one data center, where the node creation request provides first information for the first node and second information for the second node. Creating the task data elements includes creating the first task data element that includes the first information (e.g., first information 350A) for the first node, and creating the second task data element that includes the second information (e.g., second information 350B) for the second node. Initiating execution of the first task includes initiating, by the first worker process, execution of a first node creation task to create the first node based on the first information, and initiating execution of the second task includes initiating, by the second worker process, execution of a second node creation task to create the second node based on the second information. In certain cases, the first information provided in the node creation request may include an identifier of the first node, an identifier of a first data center of the at least one data center that is to provide the first node, and one or more security credentials associated with the first data center. The second information provided in the node creation request may include an identifier of the second node, an identifier of a second data center of the at least one data center that is to provide the second node, and one or more security credentials associated with the second data center.

In some examples, the first task includes a sequence of two or more subtasks having a defined order, and the first task data element includes information associated with the sequence of the two or more subtasks. Initiating execution of the first task includes initiating, by the first worker process, execution of at least one subtask in the sequence of the two or more subtasks.

In some examples, the task data elements include at least a third task data element, and the task data structure is further accessible by at least a third worker process. In these examples, process 690 further includes removing, by the third worker process, the third task data element from the task data structure and initiating execution of a third task associated with the third task data element. The response is further associated with a respective status of the third task.

In some examples, process 690 further includes receiving, from the client device, a second resource management request associated with the one or more resources provided by the at least one data center, creating, based on the second resource management request, at least a third task data element, and adding the third task data element to a second task data structure (e.g., task queue 422T shown in FIG. 4) that is different from the first task data structure (e.g., task queue 422A), where the second task data structure is accessible at least by a third worker process. In these examples, process 690 further includes removing, by the third worker process, the third task data element from the second task data structure and initiating execution of a third task associated with the third task data element, and sending, to the client computing device, a second response to the second resource management request, wherein the second response is associated with a status of the third task.

In some examples, the first worker process and second worker process each subscribe to events that are associated with the task data structure. In these examples, adding the task data elements to the task data structure includes publishing a first event associated with addition of the first task data element to the task data structure, and publishing a second event associated with addition of the second task data element to the task data structure. Process 690 further includes, before removing the first task data element from the task data structure, receiving, by the first worker process, a first notification of the first event, and, before removing the second task data element from the task data structure, receiving, by the second worker process, a second notification of the second event.

In some examples, the task data structure comprises a task queue. In some examples, each of the first worker process and the second worker process are executed by a respective processor.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
   receiving, by a controller comprising a plurality of microservices and from a client device, a first resource management request associated with one or more resources provided by at least one data center;
   creating, by the controller and based on the first resource management request, a plurality of task data elements that includes at least a first task data element and a second task data element;
   adding, by the controller and based on a first type of event associated with the plurality of task data elements, the plurality of task data elements to a first task data structure that is implemented to manage processing of the first type of event and accessible at least by a first worker process comprising a first microservice executed in one or more worker service containers deployed by the controller, a second worker process comprising a second microservice executed in the one or more worker service containers deployed by the controller, and a third worker process comprising a third microservice executed in the one or more worker service containers deployed by the controller;
   receiving, by the controller and from the client device, a second resource management request associated with the one or more resources provided by the at least one data center;
   creating, based on the second resource management request, at least a third task data element;
   adding, by the controller and based on a second type of event associated with the third task data element, the third task data element to a second task data structure that is implemented to manage processing of the second type of event, wherein the second task data structure is accessible by at least the first worker process, the second worker process, and the third worker process;
   removing, by the first worker process and based on the first task data structure being implemented to manage processing of the first type of event and based on one or more factors from a set of factors consisting of current processing capabilities of the first worker process and available bandwidth of the first worker process, the first task data element from the first task data structure and initiating execution of at least the first microservice to perform a first task associated with the first task data element;

after removing the first task data element by the first worker process, removing, by the second worker process and based on the first task data structure being implemented to manage processing of the first type of event, the second task data element from the first task data structure and initiating execution of at least the second microservice to perform a second task associated with the second task data element, wherein the second worker process executes at least a portion of the second task while the first worker process executes at least a portion of the first task in parallel;

removing, by the third worker process and based on the second task data structure being implemented to manage processing of the second type of event, the third task data element from the second task data structure and initiating execution of a third task associated with the third task data element; and sending, to the client device, a response to the first resource management request, wherein the response is associated with a respective status of each of the first and second tasks.

2. The method of claim 1, further comprising:
storing the respective status of each of the first and second tasks in a database,
wherein sending the response to the first resource management request comprises sending, to the client device, a link to the respective status of each of the first and second tasks as stored in the database.

3. The method of claim 2, further comprising:
responsive to completion of the first task, updating the status of the first task in the database to indicate one or more results of the first task; and
responsive to completion of the second task, updating the status of the second task in the database to indicate one or more results of the second task.

4. The method of claim 1,
wherein the one or more resources include at least one node, storage volume, or application container provided by the at least one data center, and
wherein receiving the first resource management request comprises receiving, from the client device, one or more of a node creation request, a node deletion request, a storage volume creation request, a storage volume deletion request, an application container creation request, or an application container deletion request associated with the one or more resources provided by the at least one data center.

5. The method of claim 4,
wherein receiving the first resource management request comprises receiving, from the client device, the node creation request to create first and second nodes that are provided by the at least one data center, the node creation request providing first information for the first node and second information for the second node,
wherein creating the plurality of task data elements comprises creating the first task data element to include the first information for the first node, and creating the second task data element to include the second information for the second node, wherein initiating execution of the first task comprises initiating, by the first worker process, execution of a first node creation task to create the first node based on the first information, and
wherein initiating execution of the second task comprises initiating, by the second worker process, execution of a second node creation task to create the second node based on the second information.

6. The method of claim 5,
wherein the first information provided in the node creation request includes an identifier of the first node, an identifier of a first data center of the at least one data center that is to provide the first node, and one or more security credentials associated with the first data center, and
wherein the second information provided in the node creation request includes an identifier of the second node, an identifier of a second data center of the at least one data center that is to provide the second node, and one or more security credentials associated with the second data center.

7. The method of claim 1,
wherein the first task includes a sequence of two or more subtasks having a defined order,
wherein the first task data element includes information associated with the sequence of the two or more subtasks, and
wherein initiating execution of the first task comprises initiating, by the first worker process, execution of at least one subtask in the sequence of the two or more subtasks.

8. The method of claim 1, further comprising:
sending, to the client device, a second response to the second resource management request, wherein the second response is associated with a status of the third task.

9. The method of claim 1,
wherein the first worker process and second worker process each subscribe to the first type of events that are associated with the first task data structure,
wherein adding the plurality of task data elements to the first task data structure comprises publishing a first event associated with addition of the first task data element to the first task data structure, and publishing a second event associated with addition of the second task data element to the first task data structure, wherein the first event and the second event correspond to the first type of event, and
wherein the method further comprises:
before removing the first task data element from the first task data structure, receiving, by the first worker process, a first notification of the first event; and
before removing the second task data element from the first task data structure, receiving, by the second worker process, a second notification of the second event.

10. The method of claim 1, wherein the first task data structure comprises a task queue, and wherein each of the first worker process and the second worker process are executed by a respective processor.

11. A controller, comprising:
one or more processors;
an application;
a first worker process comprising at least a first microservice executed in one or more worker service containers deployed by the controller;

a second worker process comprising at least a second microservice executed in the one or more worker service containers deployed by the controller;

a third worker process comprising at least a third microservice executed in the one or more worker service containers deployed by the controller;

a first task data structure implemented to manage processing of a first type of event and accessible by at least the first worker process, the second worker process, and the third worker process;

a second task data structure implemented to manage processing of a first type of event and accessible by at least the first worker process, the second worker process, and the third worker process; and at least one computer-readable storage medium storing instructions that, when executed, cause the one or more processors to:

receive, from a client device, a first resource management request associated with one or more resources provided by at least one data center, wherein the one or more resources comprise at least one node, storage volume, or application container provided by the at least one data center;

create, based on the first resource management request, a plurality of task data elements that includes at least a first task data element and a second task data element;

add, based on a first type of event associated with the plurality of task data elements, the plurality of task data elements to the first task data structure;

receive, from the client device, a second resource management request associated with the one or more resources provided by the at least one data center;

create, based on the second resource management request, at least a third task data element;

add, by the controller and based on a second type of event associated with the third task data element, the third task data element to the second task data structure;

remove, by the first worker process and based on the first task data structure being implemented to manage processing of the first type of event and based on one or more factors from a set of factors consisting of current processing capabilities of the first worker process and available bandwidth of the first worker process, the first task data element from the first task data structure and initiating execution of at least the first microservice to perform a first task associated with the first task data element;

after removing the first task data element by the first worker process, remove, by the second worker process and based on the first task data structure being implemented to manage processing of the first type of event, the second task data element from the first task data structure and initiating execution of at least the second microservice to perform a second task associated with the second task data element, wherein the second worker process executes at least a portion of the second task while the first worker process executes at least a portion of the first task in parallel;

remove, by the third worker process and based on the second task data structure being implemented to manage processing of the second type of event, the third task data element from the second task data structure and initiating execution of a third task associated with the third task data element; and send, to the client device, a response to the first resource management request, wherein the response is associated with a respective status of each of the first and second tasks.

12. The controller of claim 11,
wherein the instructions stored by the at least one computer-readable storage medium further cause the one or more processors to store the respective status of each of the first and second tasks in a database, and wherein the instructions stored by the at least one computer-readable storage medium that cause the one or more processors to send the response to the first resource management request further cause the one or more processors to send, to the client device, a link to the respective status of each of the first and second tasks in the database.

13. The controller of claim 11, wherein the instructions stored by the at least one computer-readable storage medium that cause the one or more processors to receive the first resource management request further cause the one or more processors to receive, from the client device, one or more of a node creation request, a node deletion request, a storage volume creation request, a storage volume deletion request, an application container creation request, or an application container deletion request associated with the one or more resources provided by the at least one data center.

14. The controller of claim 13,
wherein the instructions stored by the at least one computer-readable storage medium that cause the one or more processors to receive the first resource management request further cause the one or more processors to receive, from the client device, the node creation request to create first and second nodes that are provided by the at least one data center, the node creation request providing first information for the first node and second information for the second node, wherein the instructions stored by the at least one computer-readable storage medium that cause the one or more processors to create the plurality of task data elements further cause the one or more processors to create the first task data element to include the first information for the first node, and create the second task data element to include the second information for the second node, wherein the instructions stored by the at least one computer-readable storage medium that cause the one or more processors to initiate execution of the first task further cause the one or more processors to initiate, by the first worker process, execution of a first node creation task to create the first node based on the first information, and wherein the instructions stored by the at least one computer-readable storage medium that cause the one or more processors to initiate execution of the second task further cause the one or more processors to initiate, by the second worker process, execution of a second node creation task to create the second node based on the second information.

15. The controller of claim 14,
wherein the first information provided in the node creation request includes an identifier of the first node, an identifier of a first data center of the at least one data center that is to provide the first node, and one or more security credentials associated with the first data center, and wherein the second information provided in the node creation request includes an identifier of the second node, an identifier of a second data center of the at least one data center that is to provide the second node, and one or more security credentials associated with the second data center.

16. The controller of claim 11,
wherein the first task includes a sequence of two or more subtasks having a defined order,
wherein the first task data structure includes information associated with the sequence of the two or more subtasks, and
wherein the instructions stored by the at least one computer-readable storage medium that cause the one or more processors to initiate execution of the first task further cause the one or more processors to initiate, by the first worker process, execution of at least one subtask in the sequence of the two or more subtasks.

17. The controller of claim 11, wherein the instructions stored by the at least one computer-readable storage medium further cause the one or more processors to:
send, to the client device, a second response to the second resource management request, wherein the second response is associated with a status of the third task.

18. The controller of claim 11, wherein each of the first worker process and the second worker process are executed by a respective one of the one or more processors.

19. A computer-readable storage medium storing instructions that are executable by at least one processor to:
receive, by a controller comprising an application and a plurality of microservices, from a client device, a resource management request associated with one or more resources provided by at least one data center, wherein the one or more resources comprise at least one node, storage volume, or application container provided by the at least one data center;
create, by the controller and based on the resource management request, a plurality of task data elements that includes at least a first task data element and a second task data element;
add, by the controller, the plurality of task data elements to a task data structure that is accessible at least by a first worker process comprising at least a first microservice executed in one or more worker service containers deployed by the controller and a second worker process comprising at least a second microservice executed in the one or more worker service containers deployed by the controller;
remove, by the first worker process and based on one or more factors from a set of factors consisting of current processing capabilities of the first worker process and available bandwidth of the first worker process, the first task data element from the task data structure and initiate execution of at least the first microservice to perform a first task associated with the first task data element;
after removing the first task data element by the first worker process, remove, by the second worker process, the second task data element from the task data structure and initiate execution of at least the second microservice to perform a second task associated with the second task data element, wherein the second worker process executes at least a portion of the second task while the first worker process executes at least a portion of the first task in parallel; and
send, to the client device, a response to the resource management request, wherein the response is associated with a respective status of each of the first and second tasks.

* * * * *